United States Patent [19]

Hadamek

[11] Patent Number: 4,743,983
[45] Date of Patent: May 10, 1988

[54] RECOVERING DATA FROM MAGNETIC RECORDING TAPE ADHERED AFTER LONG STORAGE

[75] Inventor: Albert Hadamek, Houston, Tex.

[73] Assignee: Texaco Inc., White Plains, N.Y.

[21] Appl. No.: 891,040

[22] Filed: Jul. 31, 1986

[51] Int. Cl.⁴ .............................................. G11B 5/00
[52] U.S. Cl. ..................................................... 360/55
[58] Field of Search .......................... 360/55; 156/344; 242/186

*Primary Examiner*—Raymond F. Cardillo
*Assistant Examiner*—Kevin J. Fournier

*Attorney, Agent, or Firm*—Jack H. Park; Kenneth R. Priem; Richard A. Morgan

[57] ABSTRACT

A method has been discovered for recovering data recorded on magnetic recording tape wherein adjacent layers have become adhered after long storage times, even at recommended storage conditions. The method comprises localized heating of the tape in an amount sufficient to break hydrogen (physical) bonding between the binder and the film backing. A continuous tension is applied to the tape, while withdrawing it from the spool to break residual adhesion. The spool is turned at a rate of speed sufficient to carry away heat so that the film does not reach the heat distortion temperature.

8 Claims, 1 Drawing Sheet

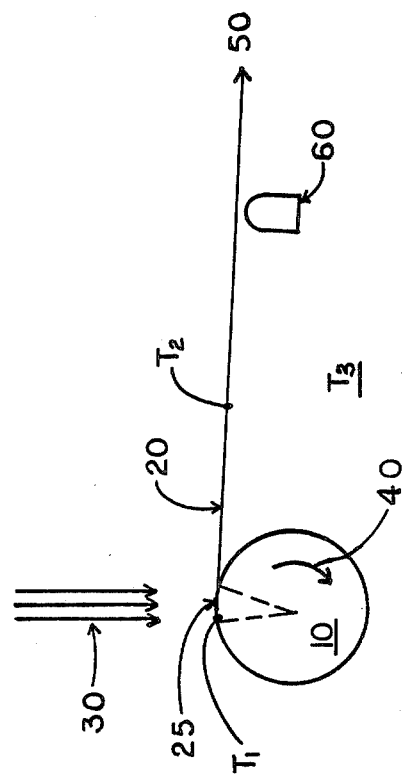

RECOVERING DATA FROM MAGNETIC RECORDING TAPE ADHERED AFTER LONG STORAGE

BACKGROUND OF THE INVENTION

1. Field of the Invention

The invention is a method for recovering the data recorded on magnetic recording tape wherein adjacent layers of tape have become destructively adhered after long periods of storage on a spool.

2. Description of the Useful Arts

Magnetic recording tapes consist of magnetic oxide particles dispersed in a suitable polymeric binder material that is uniformly coated over the surface of a flexible film base material typically a polyester. The film base material is typically made of polyethylene teraphthalate (mylar) which is chemical and temperature stable and non-magnetic. The polymeric binder coating material is typically a polyurethane elastomer which contains a dispersion of gamma ferric oxide particles as well as numerous chemical constituents which give the recording tape its required particle dispersion, tape flexibility, conductivity, and relative softness which ensure intimate physical contact between the tape and the record/reproduce transducer.

The retention of the magnetically recorded data is performed solely by the gamma ferric oxide particles with the remaining constituents of the tape coating acting as a binder or carrier for these particles. Any distortion of the flexible film base or the coating or both, or any breakdown or alteration of the chemical structure of the binder will result in a mispositioning of the magnetic particles during operation, or a loss or misalignment of both the binder and particles. Such a loss or misalignment of the binder causes a loss of data on the magnetic recording tape. Studies have shown that other than from unwanted magnetic fields, there is almost no loss of data which does not stem from an alteration in some physical or chemical property of the polymeric binder material. Fortunately, many conditions which cause data losses through the physical and chemical deterioration of the binder can be controlled through temperature and humidity controls and regular tape rewinding.

Blocking is the term used in the art to describe the adhering quality or stickiness wherein magnetic recording tape, when wound up into a roll, cannot be unwound because it has adhered to itself. Blocking prevents the recovery of data from tape and resulting loss of data. Information is recorded in 9 tracks (channels) on ½-inch wide tape at the level of 1600 bits per inch. A small disruption in the continuity of the magnetic layer containing the densely packed data matrix due to tape adherence, causes a loss of the data on the tape.

In order to eliminate adhesion of magnetic recording tape it is recommended that stored tape be rewound on a semiannual or annual schedule. If the tape has been maintained in a temperature and humidity controlled environment, i.e. 17° C. (62° F.) to 20° C. (68° F.) and 35% to 45% relative humidity, the interval between rewinds can be extended to 3.5 years. (*Care and Handling of Computer Magnetic Storage Media*, NBS Special Publication 500-101, U.S. Dept. of Commerce, issued June 1983, pp. 82–83.) Applicant has found when rewinding of stored tape is omitted, that after about 4 years sporatic, unpredictable self adhesion of tapes occurs with the complete loss of data even though the tape is stored in the recommended, climate controlled environment.

DESCRIPTION OF THE DRAWING

The drawing is a schematic representation of the inventive method.

A spool 10 of magnetic tape has been stored in an air conditioned storage room for 4 to 7 years and has become self adhered. A length of freed tape 20 is drawn from the spool 10. The initial piece of freed tape 10 is a leader and contains no data. Heating 30 is briefly applied to tape segment 25 on the back side of the tape 20, raising the temperature to $T_1$ to below the heat distortion temperature. Heating is sufficient to break hydrogen bonding. Tension 50 is applied to tape 20, drawing it away from spool 10. This is typically accomplished in an air conditioned room at temperature $T_3$, which quenches the tape 20 to temperature $T_2$. The heating 30, tension 50 and drawing are balanced according to the degree of adhesion, room temperature $T_3$ and drawing speed 40 to break adhesion and draw tape 20 free of spool 10. This allows for recovery of data by means of transducer 60.

SUMMARY OF THE INVENTION

The invention is a method for recovering data from a supply of magnetic recording tape wherein adjacent layers have self adhered due to undisturbed storage for periods in excess of four years. It is understood that for purposes of this invention, storage is at U. S. Department of Commerce, National Bureau of Standards recommended controlled conditions of 17° C. (62° F.) to 20° C. (68° F.) and 35% to 45% relative humidity and that self adhesion is due primarily to the length of storage time at otherwise acceptable conditions.

The magnetic recording tape comprises a continuous film support comprising a first side with a continuous magnetic layer. The magnetic layer comprises metal powder dispersed through a polyurethane binder. The film support also comprises a second magnetic layer free side. The self adhesion is destructive in that it to causes transfer of the magnetic layer to the second side in amounts sufficient to break the continuity of the magnetic layer on unspooling. The transfer of magnetic layer and breaking of continuity prevents recovery of data contained on the tape.

The method comprises the steps of drawing freed tape from the supply by applying continuous tension to the freed tape. Freed tape is unwound from the self adhered spool of tape. Simultaneously, localized heating is applied to the magnetic tape from the second side in the area adjacent the tape segment where the breaking of adhesion is required. Sufficient heat is applied to break adhesion comprising hydrogen (physical) bonding between the magnetic layer and the second side, but not sufficient to melt the polyurethane binder. The freed tape is drawn at a speed to break any residual adhesion and to maintain the tape temperature below the heat distortion temperature of the film support. The binder breaks adhesion with the second side and maintains continuity and bonding to the first side. The relative position of the magnetic particles in the magnetic layer is not altered, thereby allowing for recovery of data.

DESCRIPTION OF THE PREFERRED EMBODIMENTS

Magnetic recording tape consists of a very uniform magnetic coating which is bonded to a support film. Magnetic tape is utilized for audio, video, computer, instrumentation, or other recordings.

The basic components of a magnetic recording tape are the support film and the magnetic coating. The magnetic coating contains magnetized particles which store the information and a resinous binder which provides the cohesive matrix between the magnetic particles and adheres them to the support film. The preferred polymer for the support film is polyethylene terephthalate due to its excellent dimensional stability, high tensile strength, toughness, pliability and resistance to attack by mildew and fungus. The manufacture of polyethylene terephthalate film is described in U.S. Pat. No. 4,302,506 to Heberger, incorporated herein by reference. Other polymers such as polyvinyl chloride and polypropylene have also been used. These support films have a thickness of from 5 to 50 microns, preferably 10 to 36 microns. These films decompose on heating rather than melting. Because the films are so thin, the first sign of decomposition is the heat distortion of the film. The heat distortion temperature of the various support films is known in the art. For example, the heat distortion temperature of polyethylene terephthalate film has been reported at 280° F. to 290° F. in U.S. Pat. No. 3,958,064 to Brekken et al., incorporated herein by reference.

Gamma ferric oxide is the most widely used magnetic particle. The general process for preparing this material is described in U.S. Pat. No. 4,562,117 to Kikukawa et al., incorporated herein by reference.

Binder systems for magnetic tape coatings are based on blends of hard and plasticizing or toughening resins. Magnetic recording tapes employing polyurethanes as binder for the magnetic layer have been known a long time. Polyurethanes have proved to be particularly suitable as binders for magnetic recording tapes which are subjected to hard wear. Polyester urethanes as the sole binder have been tried but they do not impart sufficient hardness to the surface of the magnetic layer. Polyurethanes have also been combined with other binders to obtain better recording film properties. However, changes in polyurethane binder formulation do not eliminate the self adhesion of adjacent layers of tape under conditions of elevated temperature and pressure. There is also a tendency for the tape to self adhere at recommended climate controlled temperatures, particularly after long undisturbed storage periods.

The self adhering or blocking of magnetic recording tape has been studied in detail. It has been theorized that the adhesion is caused by hydrolysis; the reaction of atmospheric water with polyurethane binder. The rate of hydrolysis was found to depend on the specific constituents of the binder. The combining of the atmospheric water vapor with the polyurethane causes binder weakening and the ensuing gumminess and breakdown of the tape binder.

The theoretical basis for the method is not known with mathematical certainty. However, applicant has postulated a mechanism which is consistent with the known properties of magnetic tape constituents and with experimental observations. The magnetic layer is firmly bonded to the film support in the manufacturing process. During storage, hydrolysis of polyurethane in the binder causes a stickiness which establishes hydrogen (physical) bonding with the film. The random transfer of magnetic layer to the film back, typically in tiny, though visible specs, indicates that the two competing bonding forces are approximately equal. The application of localized heating alters the relative bond strengths, favoring the bonding from the tape manufacturing process and weakening or breaking the storage acquired bonds. The slow drawing of tape from the reel with tension finally breaks any residual adhesion. The superiority of the bonding formed at manufacture is reestablished. Of course, the method is not a permanent cure for storage induced bonding. Deterioration of the binder has been noticed after application of the method. It is not known whether this deterioration is caused by the original storage induced bonding or by the heating and drawing of the inventive method. In either cause, continued prolonged storage of data on recovered tape is not recommended as subsequent storage induced bonding followed by recovery further diminishes the data reproduction quality of the tape.

Applicant has discovered by experimentation that the adhesion between the back side of the support film and polyurethane binder due to prolonged inactive storage can be overcome by the application of localized heating to the tape as it is drawn from the spool. The tapes were maintained in a cool, air conditioned atmosphere. It was therefore convenient to subject the entire spool of adhered tape to a preheat before drawing the tape from the spool. The preheat is simply a method for quickly adding a portion of the total heat duty required for the method and allowing for a faster spool speed.

After the preheat, tape is slowly drawn from the spool, with localized heating of the tape back, adjacent the segment of the tape where tape separates from the spool. Localized heating has been conveniently applied with a heat gun. To begin the method, visual inspection indicates that hydrogen (physical) bonds have been broken between the magnetic layer and the film layer, because the film falls away from the spool without the loss of magnetic layer material. Visual inspection also allows for a tape spool speed which prevents heat distortion of the film. Heat distortion of the film changes the relative position of magnetic particles within the magnetic layer matrix and renders the data lost and permanently unrecoverable.

By carefully balancing the amount of heat added and the spool speed, a steady state is rapidly achieved in which close attention is not required. By this method, applicant has recovered film from self adhered spools at the rate of 20 inches/second. This speed is not limiting, but was chosen because it was an attained steady state which did not require close attention by the technician.

This method is shown by way of Example.

EXAMPLE

Spools of one inch Memorex ® magnetic recording tape had become self adhered after storage for over four years in an air conditioned room. When the spools were mounted on a tape drive in an attempt to recover data, the magnetic layer adhered in spots to the back side of the tape and the data was unrecoverable.

A spool of adhered tape was mounted on a variable speed tape drive which allowed for control of tape speed at a relatively slow speed of 0 to 20 inches per second. The tape was first preheated by turning the spool while applying heat to the outer layer of tape. Preheating warmed the tape in the air conditioned room.

After preheating, the spool speed was slowed to about 0.25 revolutions per minute and localized heating applied for several moments with a 800 watt heat gun to a segment where tape adhered to the spool. The amount of heating was controlled by adjusting the distance of the heat gun from the tape. Tape then pulled away from the spool with a light constant tension approximately equal to the tension applied by the take up reel of a tape drive. By visual inspection, no magnetic layer was left on the back of the film. The freed tape was attached to the take up reel, which continued to draw film at a constant tension at this slow rate of sped.

Heating was reduced and spool speed increased up to the 20 inches per second to avoid heat distortion of the film. The binder did not break away from the continuous magnetic layer. By balancing the heat and spool speed, a steady state was quickly achieved. At this steady state, the air temperature directly adjacent the film on the heated side was a steady 200° F. by mercury thermometer and the spool speed was measured at 20 inches per second. Once steady state was achieved, only occasional visual inspection was required to maintain the parameters within the specified range.

After the tape was run through, it was mounted on a standard tape drive and the data contained thereon printed out. The data was perfectly recovered.

The recovered tape was then duplicated by standard means on a new tape and the previously adhered tape discarded. The use of the recovered tape to transfer the data to a new tape is the best mode contemplated by applicant in carrying out the method of the invention. The method does not restore tape, but merely allows for the recovery of data by a transducer at least once. In the duplicating of the previously adhered tape, extra care should be taken to clean the tape head and contact surfaces. Although the tape has been conditioned for at least one additional data recovery, the tape is susceptible to deterioration and may leave excess quantities of binder on the head and other contacting surfaces.

Applicant has recovered data by this method from recording tape which was declared unrecoverably by the manufacturer.

While particular embodiments of the invention have been described, it will be understood that the invention is not limited thereto since modification may be made. For example, visual inspection is not required for the method, and this function can be replaced with electronic detectors. The entire method, particularly the balancing of heating and tape speed can be automated, with an electronic detection of any material laid down on the surface providing a feed back signal. Absolute parameters for the process control system include the heat distortion temperature of film and conventional tape drive speeds. It is therefore contemplated to cover by the appended claims any such modifications as fall within the spirit and scope of the claims.

What is claimed is:

1. A method for recovering data from a supply of spooled magnetic recording tape, said tape comprising a continuous film support comprising a first side with a continuous magnetic layer comprising magnetic metal powder dispersed through a polyurethane binder and a second side free of a magnetic layer wherein during storage, adjacent layers of tape have adhered causing; on unspooling of freed tape, transfer of magnetic layer to said second side in amounts sufficient to break the continuity of said magnetic layer thereby preventing recovery of data contained thereon; said method comprising the steps of:
   a. heating the second side of an adhered, spooled tape segment in an amount sufficient to break adhesion between said magnetic layer and said second side, and less than the amount to reach the heat distortion temperature of the film support,
   b. simultaneously drawing tape from the spooled supply to break residual adhesion between said magnetic layer and said second side, and to remove the tape segment from said heating
thereby maintaining the continuity of the magnetic layer and recovery data.

2. The method of claim 1 wherein the film support comprises polyethylene terephthalate.

3. The method of claim 1 which additionally comprises preheating.

4. The method of claim 1 wherein storage is for periods in excess of 4 years.

5. A method for recovering data from a supply of spooled magnetic recording tape, said tape comprising a continuous film support comprising a first side with a continuous magnetic layer comprising magnetic metal powder dispersed through a polyurethane binder and a second side free of a magnetic layer wherein during storage, adjacent layers of tape have adhered causing; on unspooling of freed tape, transfer of magnetic layer to said second side in amounts sufficient to break the continuity of said magnetic layer thereby preventing recovery of data contained thereon; said method comprising the steps of:
   a. heating the second side of an adhered, spooled tape segment, in an amount sufficient to break bonding between said magnetic layer and said side,
   b. simultaneously drawing tape from the spooled supply and from the heating at a rate sufficient to maintain the tape temperature below the melting temperature of polyurethane binder and below the heat distortion temperature of film support;
thereby maintaining the continuity of the magnetic layer and recovery data.

6. The method of claim 5 wherein the film support comprises polyethylene terephthalate.

7. The method of claim 5 which additionally comprises a preheating.

8. The method of claim 5 wherein storage is for periods in excess of 4 years.

* * * * *